US012803154B2

(12) United States Patent
Xiao et al.

(10) Patent No.: US 12,803,154 B2
(45) Date of Patent: Nov. 17, 2026

(54) ANTENNA SYSTEM AND BASE STATION

(71) Applicant: Huawei Technologies Co., Ltd., Shenzhen (CN)

(72) Inventors: Weihong Xiao, Dongguan (CN); He Cui, Dongguan (CN); Jianfeng Wei, Shanghai (CN); Tao Pu, Shanghai (CN); Pengpeng Sun, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 4 days.

(21) Appl. No.: 19/038,816

(22) Filed: Jan. 28, 2025

(65) Prior Publication Data

US 2025/0174879 A1 May 29, 2025

Related U.S. Application Data

(63) Continuation of application No. PCT/CN2023/106544, filed on Jul. 10, 2023.

(30) Foreign Application Priority Data

Jul. 30, 2022 (CN) ........................ 202210911464.2

(51) Int. Cl.
*H01Q 1/42* (2006.01)
*H01Q 1/24* (2006.01)
(Continued)

(52) U.S. Cl.
CPC ............... *H01Q 1/246* (2013.01); *H01Q 1/42* (2013.01); *H01Q 15/0013* (2013.01); *H01Q 19/10* (2013.01)

(58) Field of Classification Search
CPC ............ H01Q 1/246; H01Q 1/36; H01Q 1/42; H01Q 1/50; H01Q 1/521; H01Q 3/32;
(Continued)

(56) References Cited

U.S. PATENT DOCUMENTS

| | | | |
|---|---|---|---|
| 5,384,575 | A | 1/1995 | Wu |
| 2018/0269577 | A1 | 9/2018 | Kosaka et al. |

FOREIGN PATENT DOCUMENTS

| | | | |
|---|---|---|---|
| CN | 112599974 | A | 4/2021 |
| CN | 114094347 | A | 2/2022 |

(Continued)

*Primary Examiner* — Hoang V Nguyen
(74) *Attorney, Agent, or Firm* — Slater Matsil, LLP

(57) ABSTRACT

An antenna system includes a first antenna and a second antenna. The first antenna includes a first radiating element, a first frequency selective surface, and a first feed network. The first radiating element is disposed on a side of the first frequency selective surface, and the second antenna is disposed on a side that is of the first frequency selective surface and that is away from the first radiating element. The first frequency selective surface includes a plurality of first strip-shaped structures and a plurality of second strip-shaped structures. The first strip-shaped structures and the second strip-shaped structures are made of metal. The plurality of first strip-shaped structures intersect with the plurality of second strip-shaped structures to form a plurality of grids. The first feed network includes a first structure, and the first structure is disposed on the first strip-shaped structure.

19 Claims, 14 Drawing Sheets

(51) Int. Cl.
*H01Q 15/00* (2006.01)
*H01Q 19/10* (2006.01)

(58) Field of Classification Search
CPC .. H01Q 5/42; H01Q 15/0026; H01Q 15/0013; H01Q 15/14; H01Q 19/10; H01Q 19/22; H01Q 21/061; H01Q 21/24; H01Q 21/28; H01Q 21/0075
See application file for complete search history.

(56) References Cited

FOREIGN PATENT DOCUMENTS

| | | | | | |
|---|---|---|---|---|---|
| WO | WO-2021103032 | A1 | * | 6/2021 | ........... H01Q 1/1207 |
| WO | 2023239568 | A1 | | 12/2023 | |

* cited by examiner

ANTENNA SYSTEM AND BASE STATION

CROSS-REFERENCE TO RELATED APPLICATIONS

This application is a continuation of International Application No. PCT/CN2023/106544, filed on Jul. 10, 2023, which claims priority to Chinese Patent Application No. 202210911464.2, filed on Jul. 30, 2022. The disclosures of the aforementioned applications are hereby incorporated by reference in their entireties.

TECHNICAL FIELD

This application relates to the field of communication device technologies, and in particular, to an antenna system and a base station.

BACKGROUND

With the development of wireless communication technologies, a base station can support an increasing quantity of communication frequency bands. For example, the base station may simultaneously support a 2G (second-generation mobile phone communication technology) device, a 3G (third-generation mobile communication technology) device, a 4G (fourth-generation mobile communication technology) device, and a 5G (fifth-generation mobile communication technology) device. Therefore, a structure of a base station antenna is increasingly complex, and antenna integration of a single antenna is increasingly high. To improve integration of antennas on the base station, a requirement on miniaturization of the antennas on the base station is increasingly urgent.

SUMMARY

This application provides an antenna system and a base station, to simplify a structure of the antenna system and improve integration of antennas mounted on the base station.

According to a first aspect, this application provides an antenna system, and the antenna system includes a first antenna and a second antenna. The first antenna and the second antenna are stacked. The second antenna is disposed on a back side of the first antenna, that is, the second antenna is disposed on a side away from a radiating signal of the first antenna. The first antenna includes a first radiating element, a first frequency selective surface, and a first feed network. The first radiating element is disposed on a side of the first frequency selective surface, and the second antenna is disposed on a side that is of the first frequency selective surface and that is away from the first radiating element. The first frequency selective surface may reflect a radiating signal of the first antenna and transmit a radiating signal of the second antenna, so that the two antennas can be stacked, to reduce antenna space occupied by the antenna system. The first frequency selective surface includes a plurality of first strip-shaped structures and a plurality of second strip-shaped structures. The first strip-shaped structures and the second strip-shaped structures are made of metal. The plurality of first strip-shaped structures intersect with the plurality of second strip-shaped structures to form a plurality of grids, and to form the first frequency selective surface. The first feed network includes a first structure, and the first structure is disposed on the first strip-shaped structure. The first structure of the first feed network is disposed on the first frequency selective surface, and no additional phase shifter cavity needs to be provided to bear the first feed network. Therefore, a structure of the first antenna can be simplified, and a volume of the first antenna can be reduced, to improve a miniaturization degree of the first antenna, thereby reducing a volume of the antenna system and improving integration of antennas on the base station. With this solution, antenna space occupied by the antenna system can also be reduced, to reduce wind load of the antenna system. In addition, because no phase shifter cavity needs to be provided, and the first antenna does not block the second antenna, a size of the second antenna is not limited, so that the size of the second antenna may be greater than a size of the first antenna, thereby enriching application scenarios of the antenna system.

In another technical solution, the first feed network further includes a second structure, and the second structure is disposed on a second strip-shaped structure. That is, both the first strip-shaped structure and the second strip-shaped structure of the first frequency selective surface may be used to dispose the first frequency selective surface. The first structure and the second structure may be two different structures, or may be different parts of a same structure and be distinguished based on a disposition position.

When the first frequency selective surface is specifically disposed, the first frequency selective surface further includes a metal patch, and the metal patch is disposed in a grid. In this solution, the metal patch is disposed, so that a bandwidth for reflecting a signal by the first frequency selective surface can be increased, and signal reflection efficiency of the first frequency selective surface can be improved.

When the metal patch is specifically disposed, a metal patch may be disposed in each grid, thereby improving a filtering effect and signal uniformity of the first frequency selective surface.

The first strip-shaped structure may have a groove, and the first structure is disposed in the groove. The groove may mask off a signal in the first structure in the groove, thereby reducing signal spill-over and improving signal transmission efficiency.

Similarly, the second strip-shaped structure has a groove, and the second structure is disposed in the groove. The groove can mask off a signal in the second structure in the groove, thereby reducing signal spill-over and improving signal transmission efficiency.

In another technical solution, the first strip-shaped structure has a cavity, and the first structure is disposed in the cavity. Similarly, the cavity can mask off a signal in the first structure in the cavity, thereby reducing signal spill-over and improving signal transmission efficiency.

In addition, the second strip-shaped structure may also have a cavity, and the second structure is disposed in the cavity. The cavity can mask off a signal in the second structure in the cavity, thereby reducing signal spill-over and improving signal transmission efficiency.

The first structure only needs to be disposed on the first frequency selective surface. Specifically, the first structure may be disposed on a side that is of the first frequency selective surface and that faces the first radiating element, or may be disposed on a side that is of the first frequency selective surface and that is away from the first radiating element, or may be disposed on each of two sides of the first frequency selective surface, that is, the first structure may be disposed on each side of the first frequency selective surface. Therefore, an area of disposing the first feed network may be expanded. In addition to the first feed network, if other feed networks are included, the other feed networks may also be disposed on the first frequency selective surface.

Similarly, the second structure may also be disposed on a side that is of the first frequency selective surface and that faces the first radiating element, or may be disposed on a side that is of the first frequency selective surface and that is away from the first radiating element, or may be disposed on each of two sides of the first frequency selective surface, that is, the second structure may be disposed on each side of the first frequency selective surface.

In a specific technical solution, the first structure may include a first power splitting line, and the first power splitting line is disposed on the first strip-shaped structure. Similarly, when the first feed network includes the second structure, the second structure may also include a first power splitting line, and the first power splitting line is disposed on the second strip-shaped structure. The first power splitting line is for feeding the first radiating element, to implement a signal transmission capability of the first radiating element.

In addition, the first structure may further include a first sliding medium, and the first sliding medium is slidably disposed between the first power splitting line and the first strip-shaped structure. Similarly, when the first feed network includes the second structure, the second structure may also include a first sliding medium, and the first sliding medium is slidably disposed between the first power splitting line and the second strip-shaped structure. In this embodiment of this application, the first sliding medium and the first power splitting line may implement phase shift of the first radiating element. In other words, the first sliding medium and the first power splitting line may be used as a phase shifter, to enrich functions of the first antenna.

In another technical solution, the first antenna further includes a second radiating element and a second feed network, and the second radiating element and the first radiating element are disposed on a same side of the first frequency selective surface. The second feed network includes a third structure, and the third structure is disposed on the first frequency selective surface. Similarly, the third structure may be specifically disposed on the first strip-shaped structure or the second strip-shaped structure, or the third structure is disposed on each of the first strip-shaped structure and the second strip-shaped structure. An operating frequency band of the first radiating element is different from an operating frequency band of the second radiating element. The first antenna in this solution is a multi-band antenna, and can implement signal radiation of a plurality of frequency bands.

In a further technical solution, the first antenna may further include a second frequency selective surface. The second frequency selective surface is disposed on a side that is of the first frequency selective surface and that is away from the first radiating element. The second frequency selective surface may reflect radiating signals of the first radiating element and the second radiating element, and may transmit a radiating signal of a second antenna. In this solution, the first frequency selective surface cooperates with the second frequency selective surface, so that bandwidths for reflecting signals by the first frequency selective surface and the second frequency selective surface can be increased, an operating bandwidth of the entire first antenna can be increased, and communication efficiency of the first antenna can be improved.

In yet another technical solution, the first antenna may further include a third radiating element, a third frequency selective surface, and a third feed network. An operating frequency band of the first radiating element is different from an operating frequency band of the third radiating element, so that the first antenna is a multi-band antenna. The third radiating element and the first radiating element are disposed on a same side of the first frequency selective surface, and the third frequency selective surface is disposed on a side that is of the first frequency selective surface and that is away from the first radiating element. The third frequency selective surface may reflect radiating signals of the first radiating element and the third radiating element, and may transmit a radiating signal of the second antenna. This solution can also increase bandwidths for reflecting signals by the first frequency selective surface and the third frequency selective surface, increase an operating bandwidth of the entire first antenna, and improve communication efficiency of the first antenna. The third feed network includes a fourth structure, and the fourth structure is disposed on the third frequency selective surface.

In addition, the first antenna further includes a reflection panel, and the reflection panel is for reflecting a radiating signal of the first radiating element. The reflection panel may reflect signals of all frequency bands, and may specifically be a metal panel. With this solution, an area of the first frequency selective surface of the first antenna can be reduced, and costs of the first antenna can be reduced.

In a specific technical solution, the first antenna is a passive antenna, and the second antenna is an active antenna. With this solution, antenna space of the base station can be fully used, to improve integration of antennas on the base station.

The first antenna and the second antenna may be two independent antennas. Specifically, the first antenna includes a first radome, the second antenna includes a second radome, and the first radome and the second radome have internal cavities independent of each other. In this way, the antenna system is relatively flexible, and the first antenna or the second antenna may be replaced based on a requirement.

Alternatively, the first antenna and the second antenna may be integrated with each other. Specifically, the antenna system further includes a third radome, and the first antenna and the second antenna are disposed in an inner cavity of the third radome. Therefore, integration of the antenna system is improved.

Figure 1:
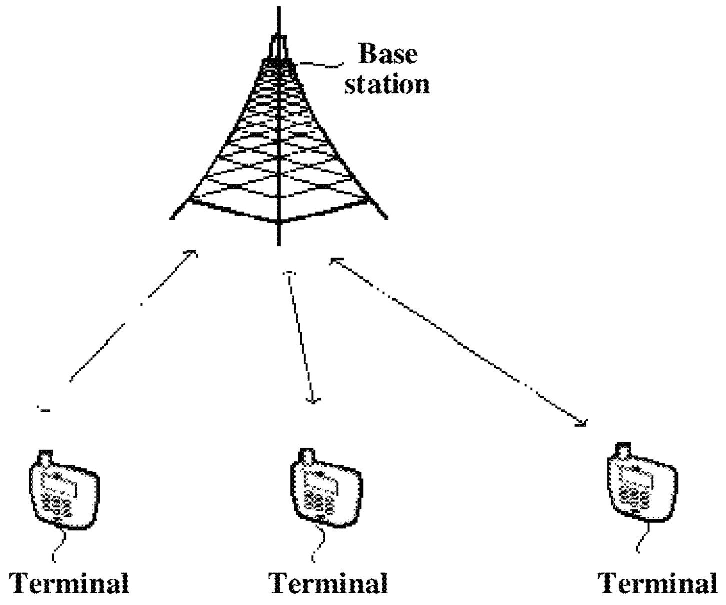
FIG. 1 is a diagram of a system architecture to which an embodiment of this application is applicable.

| Reference numerals: | |
|---|---|
| 01-antenna; | 011-radome; |
| 012-radiating element; | 013-reflection panel; |
| 014-feed network; | 0141-transmission component; |
| 0142-calibration network; | 0143-phase shifter; |
| 0144-combiner; | 0145-filter; |
| 02-mounting frame; | 03-remote radio unit; |
| 04-baseband processing unit; | 05-cable; |
| 100-antenna system; | 110-first antenna; |
| 111-first radome; | 120-second antenna; |
| 121-radiator; | 122-second radome; |
| 130-third radome; | 1-first radiating element; |
| 11-first signal layer; | 12-first ground layer; |
| 13-radiating arm; | 14-dielectric plate; |
| 2-first frequency selective surface; | 21-first strip-shaped structure; |
| 22-second strip-shaped structure; | 23-metal patch; |
| 24-groove; | 241-first bottom wall; |
| 242-first side wall; | 25-cavity; |
| 251-second bottom wall; | 252-top wall; |
| 253-second side wall; | 26-probe; |
| 3-first feed network; | 31-first structure; |
| 32-second structure; | 33-first power splitting line |
| 34-first sliding medium; | 4-directing sheet; |
| 5-second radiating element; | 6-second feed network; |
| 7-second frequency selective surface; | 8-third radiating element; |
| 9-third frequency selective surface; | 10-third feed network; |
| 20-reflection panel; | X-first direction; |
| Y-second direction; | a-first distance; |
| b-second distance. | |

DETAILED DESCRIPTION OF ILLUSTRATIVE EMBODIMENTS

To facilitate understanding of a communication apparatus and a base station provided in embodiments of this application, the following describes an application scenario of the communication apparatus and the base station. FIG. 1 is a diagram of a system architecture to which an embodiment of this application is applicable. As shown in FIG. 1, the application scenario may include a base station and a terminal. Wireless communication may be implemented between the base station and the terminal. The base station may also be referred to as an access network device, and may be located in a base station subsystem (BSS), a terrestrial radio access network (UTRAN), or an evolved terrestrial radio access network (E-UTRAN), and is configured to perform cell coverage of a signal to implement communication between a terminal device and a wireless network. Specifically, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the base station may be a relay station, an access point, a vehicle-mounted device, a wearable device, a gNodeB (gNB) in a new radio (NR) system, an access network device in a future evolved network, or the like. This is not limited in embodiments of this application.

Figure 2:
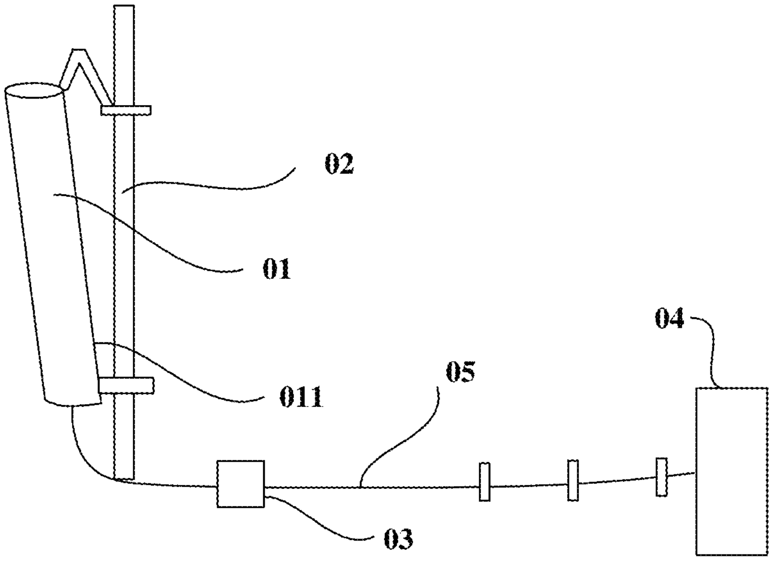
FIG. 2 is a diagram of a structure of a base station according to an embodiment of this application.

An antenna is configured for the base station to implement signal transmission in space. FIG. 2 is a diagram of a possible structure of a base station according to an embodiment of this application. As shown in FIG. 2, the base station may generally include structures such as an antenna 01 and a mounting frame 02. The antenna 01 is mounted on the mounting frame 02, so as to receive or transmit a signal of the antenna 01. Specifically, the mounting frame 02 may be a pole, a tower, or the like. FIG. 2 shows only an example of components that may be included in the base station and a positional relationship between the components. In other embodiments, the base station may further include other components, or a positional relationship between the components is different from the positional relationship shown in FIG. 2.

In addition, the base station may further include a remote radio unit 03 and a baseband processing unit 04. As shown in FIG. 2, the baseband processing unit 04 may be connected to the antenna 01 through the remote radio unit 03. The baseband processing unit 04 may be connected to a feed network of the antenna 01 through the remote radio unit 03. In some implementations, the remote radio unit 03 may also be referred to as a remote radio unit (RRU), and the baseband processing unit 04 may also be referred to as a baseband unit (BBU).

In a possible embodiment, as shown in FIG. 2, the remote radio unit 03 and the baseband processing unit 04 may both be located at a far end of the antenna 01. The remote radio unit 03 and the baseband processing unit 04 may be connected through a cable 05. It should be noted that FIG. 2 shows only an example of a positional relationship between the remote radio unit 03 and the antenna 01.

Figure 3:
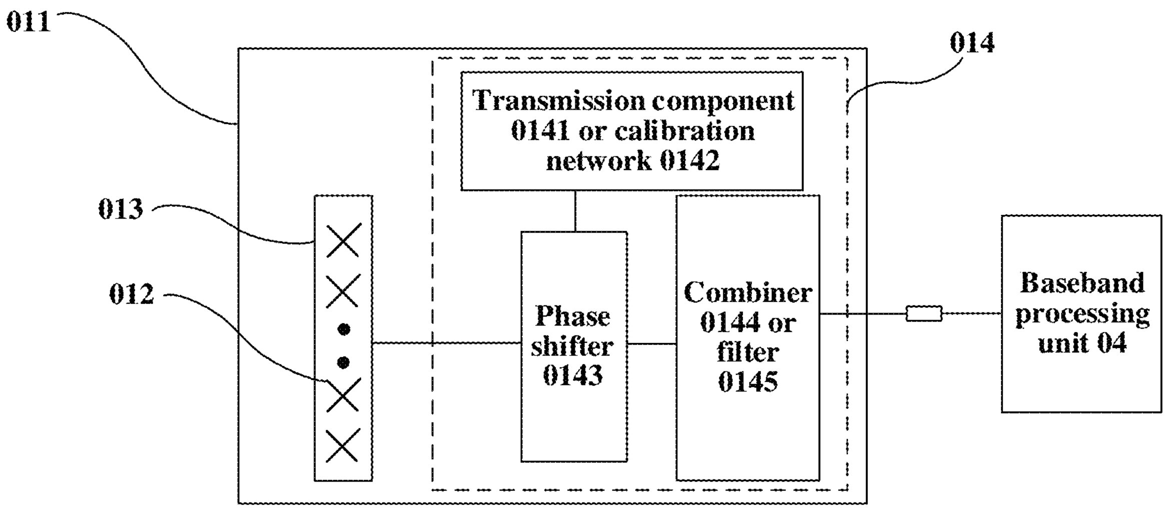
FIG. 3 is a diagram of a partial structure of an antenna according to an embodiment of this application.

More specifically, refer to FIG. 2 and FIG. 3 together. FIG. 3 is a diagram of components of an antenna according to a possible embodiment of this application. As shown in FIG. 3, the antenna 01 may include a radome 011, a radiating element 012, a reflection panel 013, and a feed network 014. The radome 011 has a good electromagnetic wave penetration characteristic in terms of electrical properties and can withstand impact of an external harsh environment in terms of mechanical performance, thereby protecting the antenna 01 from being affected by the external environment. The radiating element 012 may also be referred to as an antenna element, an element, or the like, and can effectively send or receive an antenna signal. For the antenna 01, frequencies of different radiating elements 012 may be the same or different. The reflection panel 013 may also be referred to as a bottom board, an antenna panel, a reflective surface, or the like, and may be made of a metal table. When the antenna 01 receives signals, the reflection panel 013 may reflect and aggregate the signals of the antenna 01 at a reception point. The radiating element 012 is generally placed on one side of the reflection panel 013. In this way, a signal receiving or transmitting capability of the antenna 01 may be greatly improved, and an interference signal from a back side of the reflection panel 013 (where the back side of the reflection panel 013 in this application is a side that is away from the side of the reflection panel 013 on which the radiating element 012 is disposed) can be blocked and masked off.

Still refer to FIG. 3. In a base station, the radiating element 012 is connected to the feed network 014. The feed network 014 is generally formed by controlled impedance transmission lines. The feed network 014 may feed a signal to the radiating element 012 based on a specific amplitude and phase, or send a received signal to the baseband processing unit 04 of the base station based on a specific amplitude and phase. Specifically, in some implementations, the feed network 014 may implement different radiating beam directions by using a transmission component 0141, or may be connected to a calibration network 0142 to obtain a calibration signal required by the system. The feed network 014 may include a phase shifter 0143, configured to change a maximum direction of antenna signal radiation. Some modules for performance extension may be further disposed in the feed network 014. For example, a combiner 0144 may be configured to combine signals of different frequencies into one path of signals and transmit the path of signals by using the radiating element 012; or during use in a reverse direction, the combiner 0144 may be configured to divide, based on different frequencies, signals received by the radiating element 012 into a plurality of paths of signals and transmit the paths of signals to the baseband processing unit 04 for processing. For another example, a filter 0145 is configured to filter out an interference signal.

First, for ease of understanding, it is noted that a frequency selective surface (FSS) is a two-dimensional periodic array structure, which is essentially a spatial filter, and interacts with an electromagnetic wave to show an apparent band-pass or band-stop filtering characteristic. The frequency selective surface may transmit or reflect waves of different frequencies, so that the surface has a specific frequency selection function.

Figure 4:
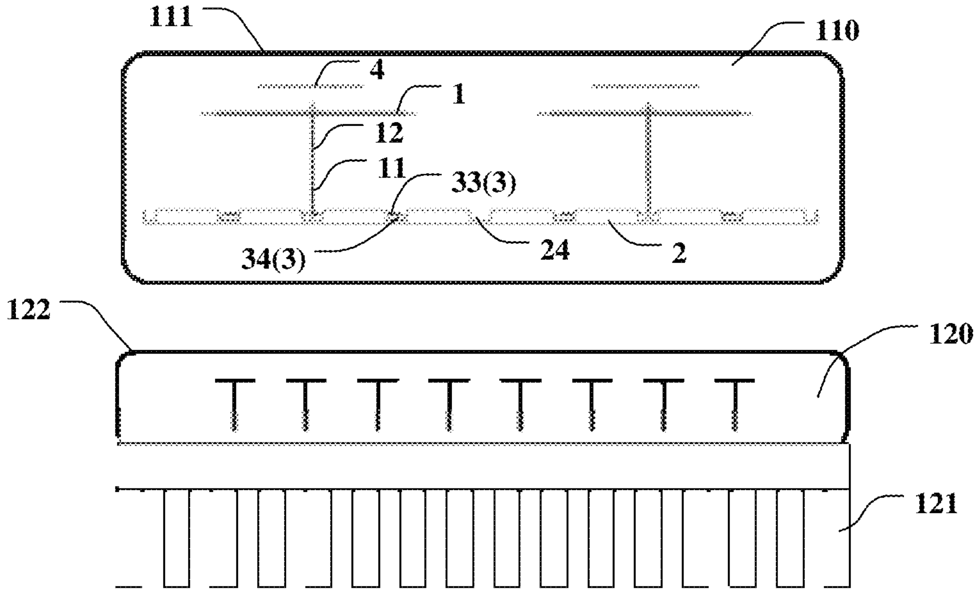
FIG. 4 is a diagram of a lateral structure of an antenna system according to an embodiment of this application.

FIG. 4 is a diagram of a lateral structure of an antenna system according to an embodiment of this application. As shown in FIG. 4, in an embodiment, the antenna system 100 includes a first antenna 110 and a second antenna 120. In a specific embodiment, the first antenna 110 and the second antenna 120 are stacked, and the second antenna 120 is disposed on a back side of the first antenna 110. The back side of the first antenna 110 is a side away from a radiating signal of the first antenna 110. This solution helps reduce space occupied by the antenna system 100 and improve integration of antennas on the base station. The first antenna 110 includes a first radiating element 1, a first frequency selective surface 2, and a first feed network 3. The first radiating element 1 is disposed on one side of the first frequency selective surface 2. The first frequency selective surface 2 is for reflecting a signal of the first radiating element 1, and is equivalent to a reflection panel of the first antenna. The second antenna 120 is disposed on a side that is of the first frequency selective surface 2 and that is away from the first radiating element 1.

In a specific embodiment, the first antenna 110 may be a passive antenna, so that signals of the second antenna 120 are not masked, and a communication effect of the second antenna 120 can be ensured. The second antenna 120 may be an active antenna, or may be a passive antenna. This is not limited in this application.

In the embodiment shown in FIG. 4, the first antenna 110 is a passive antenna, and the second antenna 120 is an active antenna. Specifically, because an active antenna has a relatively high heat generation, the active antenna may further be provided with a radiator 121, configured to dissipate heat for the active antenna. When the antennas are stacked, the active antenna can only be disposed at the rear (on a side closer to the mounting frame), and cannot be disposed at the front. Therefore, with this solution, antenna space of the base station can be fully used, so that the integration of antennas on the base station can be improved.

In a specific embodiment, an operating frequency band of the second antenna 120 may be less than an operating frequency band of the first antenna 110, so that the first frequency selective surface 2 can reflect a signal of the operating frequency band of the first antenna 110 and transmit a signal of the operating frequency band of the second antenna 120.

Figure 5:
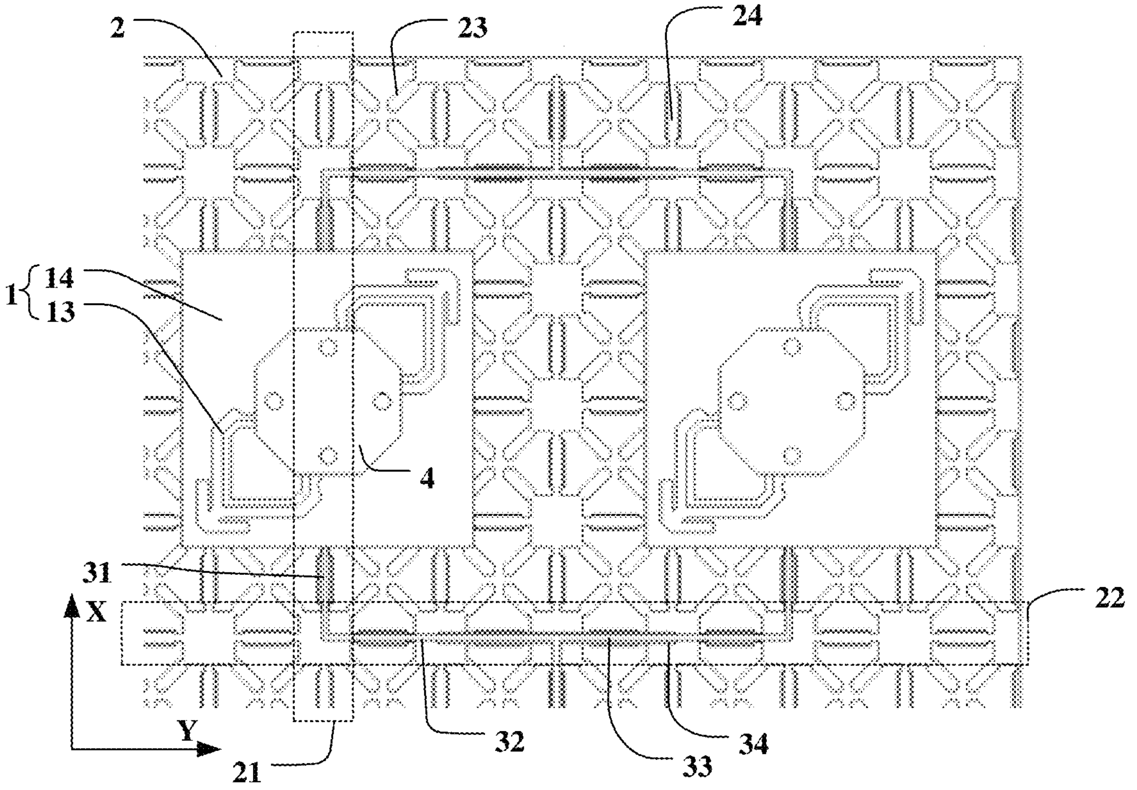
FIG. 5 is a diagram of a partial structure of a first antenna according to an embodiment of this application.

FIG. 5 is a diagram of a partial structure of a first antenna according to an embodiment of this application. As shown in FIG. 4 and FIG. 5, the first frequency selective surface 2 is made of metal, and the first frequency selective surface 2 includes a plurality of first strip-shaped structures 21 and a plurality of second strip-shaped structures 22. The plurality of first strip-shaped structures 21 and the plurality of second strip-shaped structures 22 form a plurality of grids. An overlapping area of the first strip-shaped structure 21 and the second strip-shaped structure 22 may be shared by the two structures. For example, in the embodiment shown in FIG. 5, the overlapping area is a quadrate area in which the first strip-shaped structure 21 intersects with the second strip-shaped structure 22, that is, the quadrate area is a shared overlapping area. In other words, the quadrate area is a part of both the first strip-shaped structure 21 and the second strip-shaped structure 22. The first feed network 3 includes a first structure 31, and the first structure 31 is disposed on the first strip-shaped structure 21. In this embodiment of this application, the first structure 31 of the first feed network 3 is disposed on the first frequency selective surface 2, and no additional phase shifter cavity needs to be provided to bear the first feed network 3. Therefore, a structure of the first antenna can be simplified, and a volume of the first antenna can be reduced, thereby reducing a volume of the antenna system, improving a miniaturization degree of the antenna system, and helping improve integration of antennas on the base station. With this solution, antenna space occupied by the antenna system can also be reduced, to reduce wind load of the antenna system. In addition, because no phase shifter cavity needs to be provided, and the first antenna 110 does not block the second antenna 120, a size of the second antenna 120 is not limited, so that the size of the second antenna 120 may be greater than that of the first antenna 110, enriching application scenarios of the antenna system 100.

In the embodiment shown in FIG. 5, the first radiating element 1 is located on the dielectric plate 14. Specifically, the first radiating element 1 may be a dual-polarized radiating element, that is, the dual-polarized radiating element includes two polarized radiating arms 13. One polarized radiating arm 13 is formed on a surface of one side of the dielectric plate 14 (as shown in FIG. 5), and the other polarized radiating arm 13 is formed on a surface of another side of the dielectric plate 14 (not shown in the figure).

In the embodiments shown in FIG. 4 and FIG. 5, the first antenna 110 may further include a directing sheet 4, and the directing sheet 4 is located on a side that is of the first radiating element 1 and that is away from the first frequency selective surface 2. The directing sheet 4 is for improving an electrical performance indicator of the first radiating element 1, for example, a radiation indicator such as a scattering(S) parameter and a horizontal beam width (HBW).

Still refer to FIG. 5. In a specific embodiment, the first feed network 3 may further include a second structure 32, and the second structure 32 is disposed on the second strip-shaped structure 22. In other words, the first feed network 3 may be disposed on the first strip-shaped structure 21 or the second strip-shaped structure 22, or the first feed network 3 may be disposed on both the first strip-shaped structure 21 and the second strip-shaped structure 22. This may be specifically designed based on a requirement. In this embodiment of this application, if at least a part of the structure of the first feed network 3 is disposed on the first strip-shaped structure 21 or the second strip-shaped structure 22, the first feed network 3 does not damage the structure of the first frequency selective surface 2, so as to ensure that the first frequency selective surface 2 can reflect a radiating signal of the first radiating element 1 and transmit a radiating signal of the second antenna 120. Specifically, the second antenna 120 also includes a radiating element and a reflection panel, and the radiating signal is radiated by the radiating element. Because a specific structure of the second antenna 120 is not limited in this application, details are not described herein.

Figure 6:
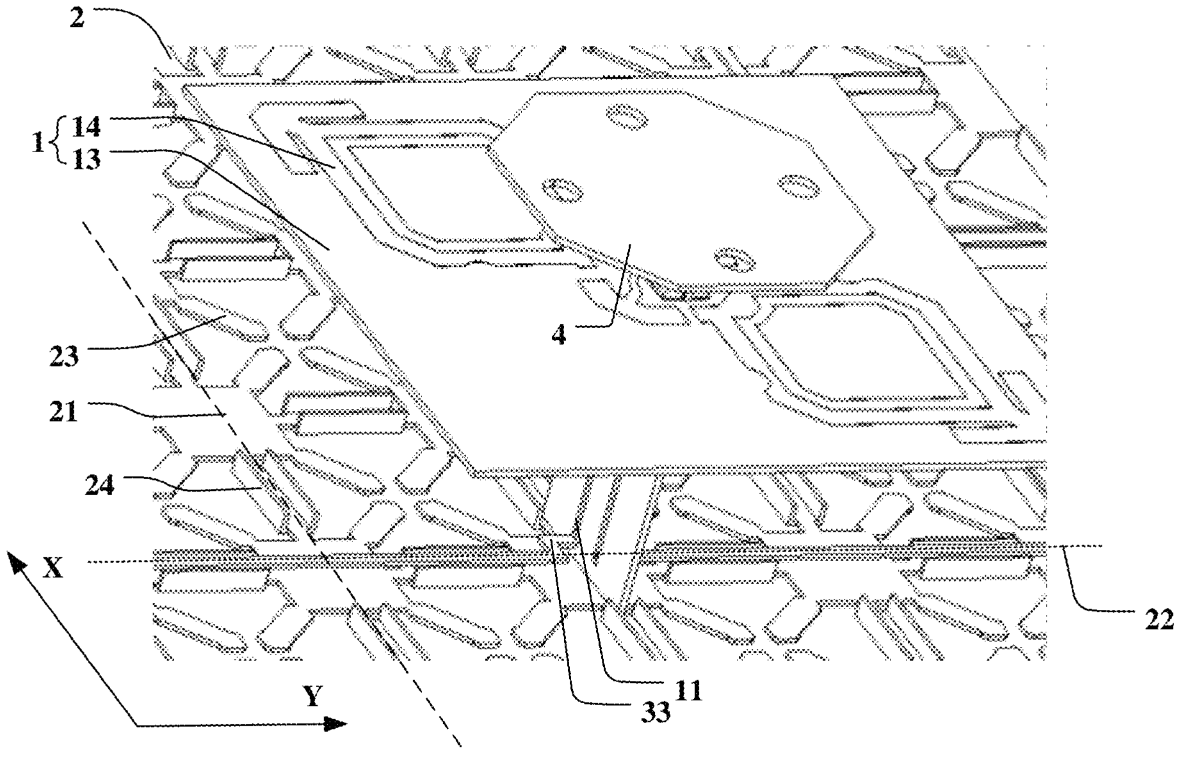
FIG. 6 is a diagram of a partially enlarged structure of a first antenna according to an embodiment of this application.
Figure 7:
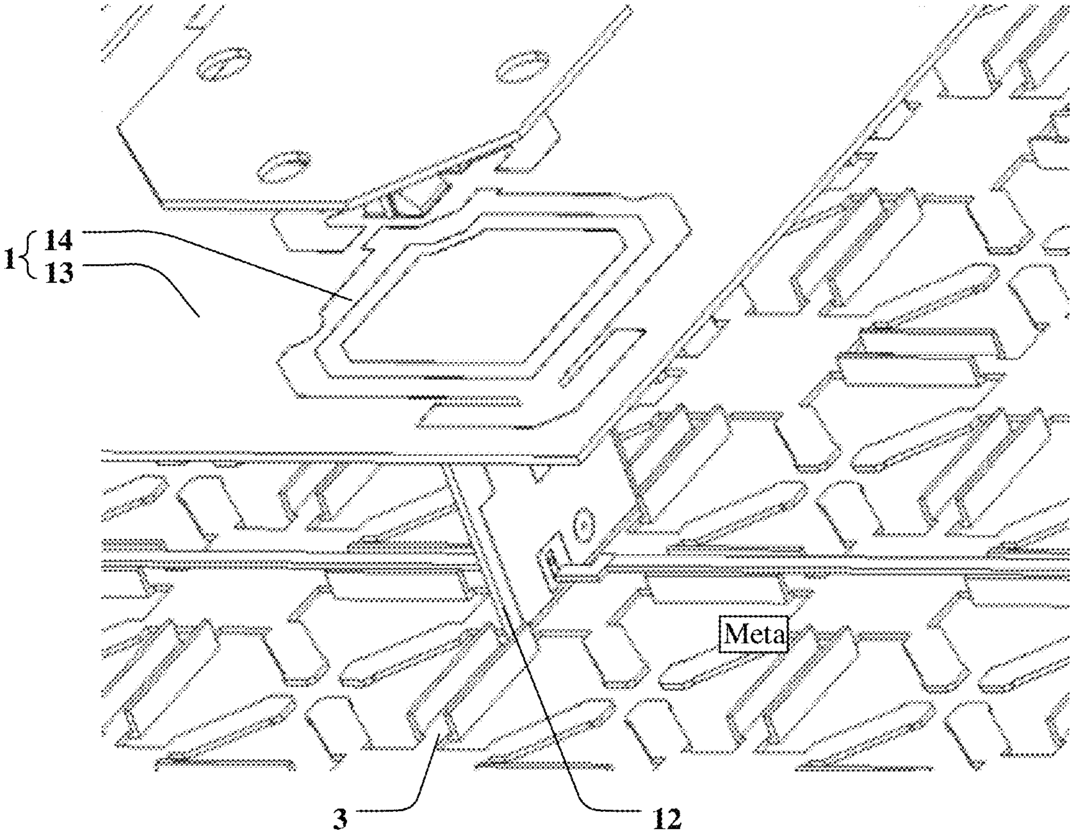
FIG. 7 is another diagram of a partially enlarged structure of a first antenna according to an embodiment of this application.

FIG. 6 is a diagram of a partially enlarged structure of a first antenna according to an embodiment of this application. FIG. 7 is another diagram of a partially enlarged structure of a first antenna according to an embodiment of this application. Refer to FIG. 4 to FIG. 7. In a specific embodiment, the first structure 31 may include a first power splitting line 33, and then the first power splitting line 33 is disposed on the first strip-shaped structure 21. The second structure 32 may also include the first power splitting line 33, and the first structure 31 and the second structure 32 may include the same first power splitting line 33. This is not limited in this application. In other words, the first structure 31 refers to a part that is of the first feed network 3 and that is disposed on the first strip-shaped structure 21, and the second structure 32 refers to a part that is of the first feed network 3 and that is disposed on the second strip-shaped structure 22. The first structure 31 and the second structure 32 may be a same structure, or even the first structure 31 and the second structure 32 may be an integral structure and be distributed at different positions of the first frequency selective surface 2.

Specifically, the first frequency selective surface 2 may be provided with an insulation system (not shown in the figures), and the first power splitting line 33 is disposed in the insulation system, so that the first power splitting line 33 is insulated from the first frequency selective surface 2. The first radiating element 1 includes a first signal layer 11 and a first ground layer 12. The first signal layer 11 is electrically connected to the first power splitting line 33, so as to feed the first radiating element 1. The first ground layer 12 is electrically connected to the first frequency selective surface 2, so that the first radiating element 1 is grounded, and the first radiating element 1 can be fixedly connected to the first frequency selective surface 2.

In a specific embodiment, the first power splitting line 33 in this embodiment of this application may be a microstrip, so that the first power splitting line 33 is easy to obtain, and occupies relatively small space.

Still refer to FIG. 4 to FIG. 7. In a specific embodiment, the first structure 31 may further include a plurality of first sliding media 34. The first sliding medium 34 is slidably disposed between the first power splitting line 33 and the first strip-shaped structure 21, and is configured to adjust a phase of the first radiating element 1 electrically connected to the first power splitting line 33, so as to implement a phase shift function of the first feed network 3. Specifically, it may be considered that the first frequency selective surface 2 is a reference ground of the first power splitting line 33, and the first sliding medium 34 is disposed between the first power splitting line 33 and the first frequency selective surface 2. In this case, it may be considered that the first power splitting line 33 and the first sliding medium 34 are equivalent to phase shifters in the first feed network 3. In this embodiment, the first antenna may be enabled to have a phase shift function, and the first frequency selective surface 2 may be directly used to accommodate the first sliding medium 34 without using an additional structure. This solution also helps reduce a volume of the first antenna, reduce a volume of the antenna system, improve integration of antennas on the base station, and reduce wind load of the antenna system.

Similarly, the second structure 32 may include a plurality of first sliding media 34. The first sliding medium 34 is disposed between the first power splitting line 33 and the second strip-shaped structure 22, and is configured to adjust a phase of the first radiating element 1 electrically connected to the first power splitting line 33, so as to implement a phase shift function of the first feed network 3. Details are not repeated herein.

Figure 8:
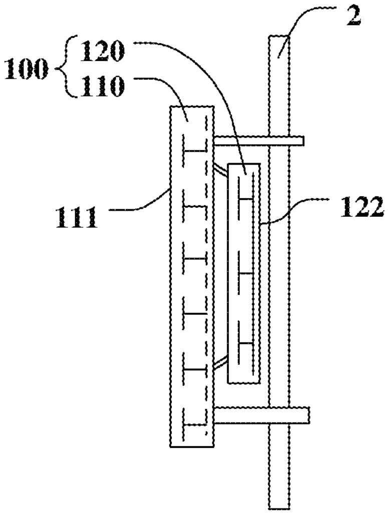
FIG. 8 is a diagram of another structure of a base station according to an embodiment of this application.
Figure 9:
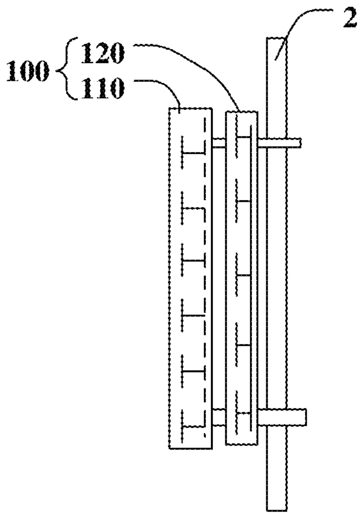
FIG. 9 is a diagram of another structure of a base station according to an embodiment of this application.
Figure 10:
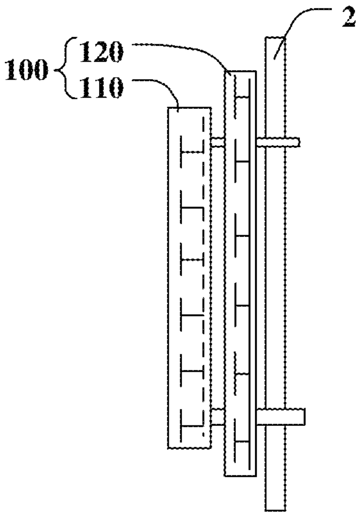
FIG. 10 is a diagram of another structure of a base station according to an embodiment of this application.

FIG. 8 is a diagram of another structure of a base station according to an embodiment of this application. FIG. 8 shows a scenario in which the antenna system 100 is applied to the base station. The antenna system 100 in the embodiment shown in FIG. 8 is equivalent to the antenna 01 in the embodiment shown in FIG. 2. The second antenna 120 is disposed on a side of the first antenna 110 and that faces the mounting frame 02. In this embodiment of this application, the first frequency selective surface 2 may be for reflecting a radiating signal of the first radiating element 1, and transmitting a radiating signal of the second antenna 120. The first antenna 110 does not need to be provided with a structure such as a phase shifter cavity, and the first frequency selective surface 2 may transmit the radiating signal of the second antenna 120, that is, the first frequency selective surface 2 may transmit an electromagnetic wave of an operating frequency band of the second antenna 120. Therefore, the first antenna 110 does not interfere with a signal of the second antenna 120. In this case, a size of the second antenna 120 is less limited, and the second antenna 120 may be disposed based on an actual requirement. The second antenna 120 may be completely disposed on a back side of the first antenna 110, and antenna space occupied by the second antenna 120 is less than antenna space occupied by the first antenna 110, as shown in FIG. 8. Alternatively, FIG. 9 is a diagram of another structure of a base station according to an embodiment of this application. As shown in FIG. 9, in another embodiment, antenna space occupied by the second antenna 120 may be relatively close to antenna space occupied by the first antenna 110. Alternatively, FIG. 10 is a diagram of another structure of a base station according to an embodiment of this application. As shown in FIG. 10, in another embodiment, antenna space occupied by the second antenna 120 may be greater than antenna space occupied by the first antenna 110. This solution helps enrich application scenarios of the antenna system 100, and the application scenarios are not limited by a size of the first antenna disposed at a front end.

In the embodiments shown in FIG. 8 to FIG. 10, the first antenna 110 includes a first radome 111, and the second antenna 120 includes a second radome 122. In addition, the first radome 111 and the second radome 122 have internal cavities independent of each other, so that the first antenna 110 and the second antenna 120 are independent of each other and decoupled from each other. This solution helps improve flexibility of disposing the antenna system 100. Replacing the first antenna 110 or the second antenna 120 based on a requirement also helps separately maintain the first antenna 110 and the second antenna 120.

Figure 11:
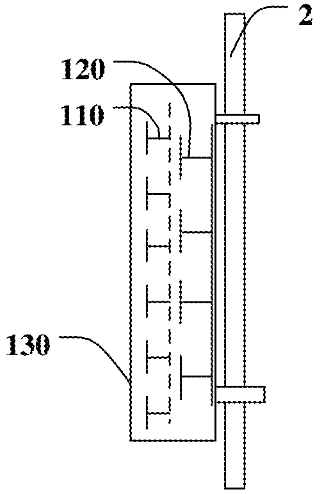
FIG. 11 is a diagram of another structure of a base station according to an embodiment of this application.

FIG. 11 is a diagram of another structure of a base station according to an embodiment of this application. As shown in FIG. 11, in another embodiment, the antenna system 100 may further include a third radome 130, and both the first antenna 110 and the second antenna 120 are disposed in an inner cavity of the third radome 130. In this embodiment, the first antenna 110 and the second antenna 120 are disposed in a same radome, that is, the first antenna 110 and the second antenna 120 are integrated as a whole. This solution helps improve integrity of the antenna system 100, and facilitates mounting and disassembly.

Figure 12:
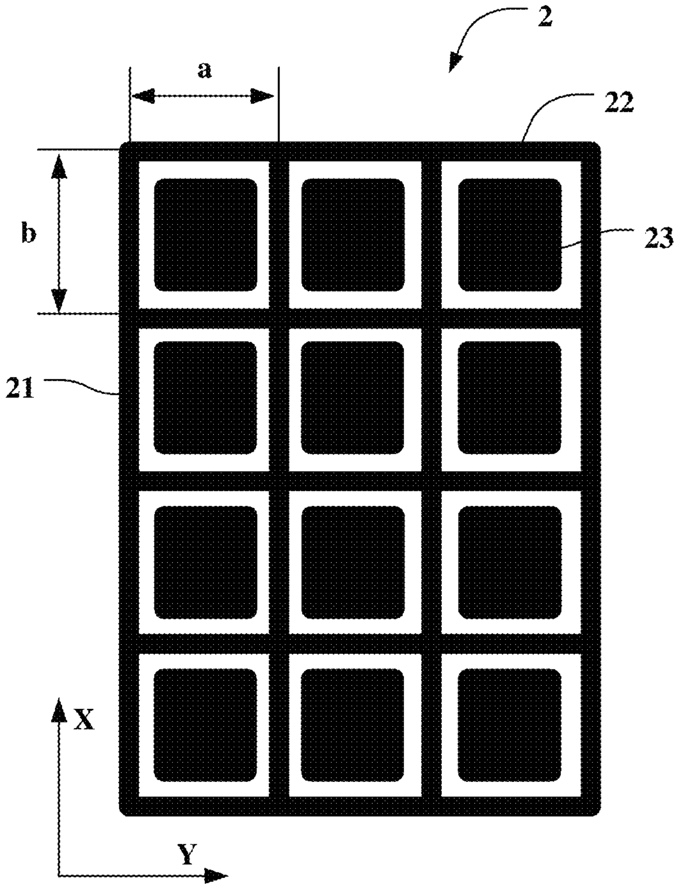
FIG. 12 is a diagram of a structure of a first frequency selective surface according to an embodiment of this application.

FIG. 12 is a diagram of a structure of a first frequency selective surface according to an embodiment of this application. As shown in FIG. 12, when the first strip-shaped structure 21 and the second strip-shaped structure 22 of the first frequency selective surface 2 are specifically disposed, two adjacent first strip-shaped structures 21 are spaced apart by a first distance a, and two adjacent second strip-shaped structures 22 are spaced apart by a second distance b. The first distance a may be equal to the second distance b, that is, grids of the first frequency selective surface 2 are quadrate grids. Therefore, in this embodiment of this application, the first frequency selective surface 2 is relatively symmetric, thereby improving a signal reflection effect of the first frequency selective surface 2, making the reflection effect relatively uniform. In addition, if another radiating element is disposed on a side that is of the first frequency selective surface 2 and that is away from the first radiating element 1, an effect of transmitting a signal of the another radiating element by the first frequency selective surface 2 is relatively uniform. In another embodiment, the first distance a may not be equal to the second distance b. Details are not described in this application.

Figure 13:
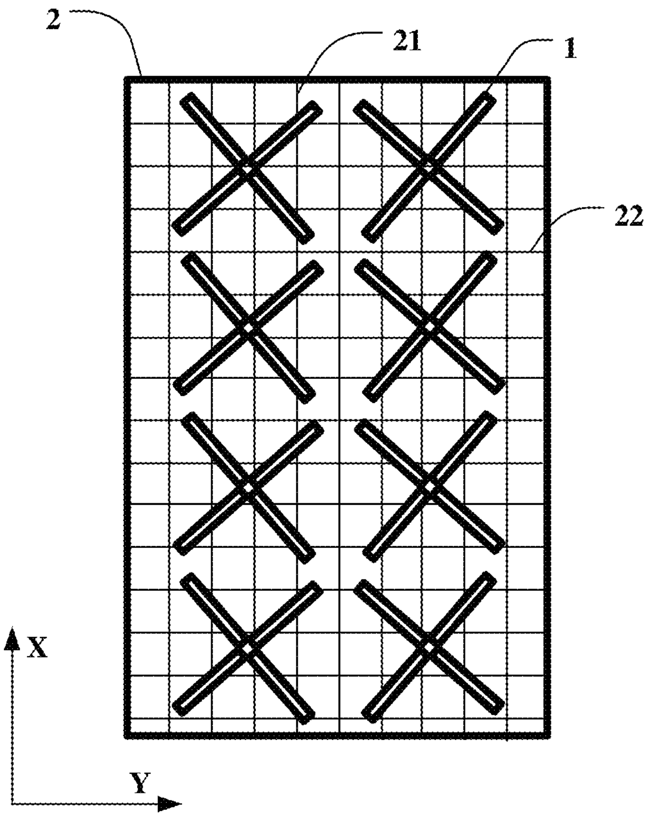
FIG. 13 is a schematic top view of a structure of a first antenna according to an embodiment of this application.

FIG. 13 is a schematic top view of a structure of a first antenna 110 according to an embodiment of this application. As shown in FIG. 13, in an embodiment, a first strip-shaped structure 21 of a first frequency selective surface 2 extends in a first direction X, and a second strip-shaped structure 22 extends in a second direction Y. The first direction X and the second direction Y may be consistent with an arrangement direction of first radiating elements 1. For example, the first radiating elements 1 are arranged into a radiating element array, and an extension direction of the radiating element array is consistent with the first direction X. The first antenna 110 may further include a plurality of radiating element arrays, and then first radiating elements 1 in adjacent radiating element arrays are arranged in the second direction Y. In other words, the first antenna 110 includes a plurality of first radiating elements 1, and the plurality of first radiating elements 1 are respectively arranged in the first direction X and the second direction Y. With this solution, an extension direction of the first power splitting line 33 disposed on the first strip-shaped structure 21 or the second strip-shaped structure 22 may be consistent with an arrangement direction of the first radiating elements 1, so as to facilitate cable layout. In a specific embodiment, the first radiating elements 1 are arranged in a form of matrix, so that the first direction X is perpendicular to the second direction Y. Certainly, in another embodiment, the first direction X may be not perpendicular to the second direction Y.

Figure 14:
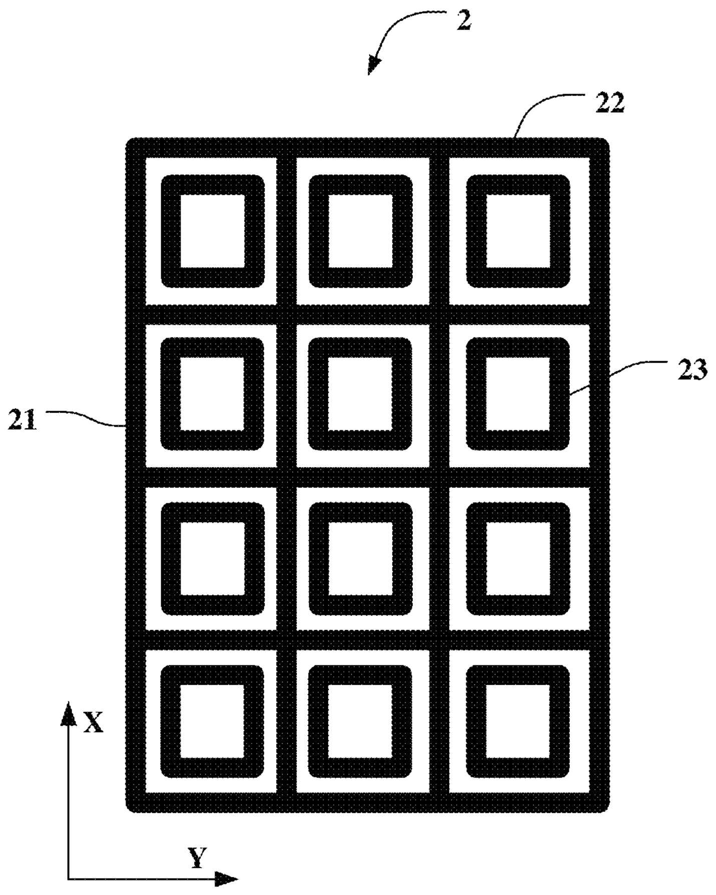
FIG. 14 is a diagram of a structure of a first frequency selective surface according to an embodiment of this application.

FIG. 14 is a diagram of a structure of a first frequency selective surface according to an embodiment of this application. As shown in FIG. 12 and FIG. 14, in a further embodiment, the first frequency selective surface 2 further includes a metal patch 23, and the metal patch 23 is disposed in the grid. In this embodiment, the metal patch 23 is disposed, so that a bandwidth for reflecting a signal by the first frequency selective surface 2 can be increased, and signal reflection efficiency of the first frequency selective surface 2 can be improved.

In this embodiment of this application, a shape and a form of the metal patch 23 are not limited. For example, in an embodiment, the metal patch 23 may be a sheet-like solid structure, as shown in FIG. 12. Alternatively, in another embodiment, the metal patch 23 may be a hollow frame structure, as shown in FIG. 14. Alternatively, the metal patch 23 may include a plurality of sub-structures. As shown in FIG. 6 and FIG. 7, the metal patch 23 in each grid includes four sub-structures, and the four sub-structures are symmetrically disposed in the grid.

Metal patches 23 in different grids may have a same shape or may have different shapes. In a specific embodiment, when the metal patches 23 in different grids have a same shape, all metal patches 23 included in the first frequency selective surface 2 may have a same shape, thereby improving symmetry of the first frequency selective surface 2.

The first frequency selective surface 2 may include a single-layer metal patch 23, or may include at least two layers of metal patches 23. Specifically, the metal patch 23 may be obtained based on an actual requirement.

The metal patch 23 may be a planar metal patch 23, or may have a bent part. Bending the metal patch 23 is similar to folding a paper. Specifically, the shape of the metal patch 23, whether the metal patch 23 bends, and the like may be designed based on a frequency bandwidth of reflection and transmission performed by the first frequency selective surface 2.

In a specific embodiment, each grid of the first frequency selective surface 2 may be provided with the metal patch 23, so that a filtering effect and signal uniformity of the first frequency selective surface 2 are improved.

In different embodiments, a specific disposition manner of the metal patch 23 is not limited in this application. For example, the metal patch 23 may be specifically connected to the first strip-shaped structure 21, may be specifically connected to the second strip-shaped structure 22, or may be connected to both the first strip-shaped structure 21 and the second strip-shaped structure 22.

The first frequency selective surface 2 may further include a dielectric layer, and the metal patch 23 is formed at the dielectric layer. Certainly, the first strip-shaped structure 21 and the second strip-shaped structure 22 may also be formed at the dielectric layer. In this embodiment, the metal patch 23 may be connected to neither the first strip-shaped structure 21 nor the second strip-shaped structure 22.

Figure 15:
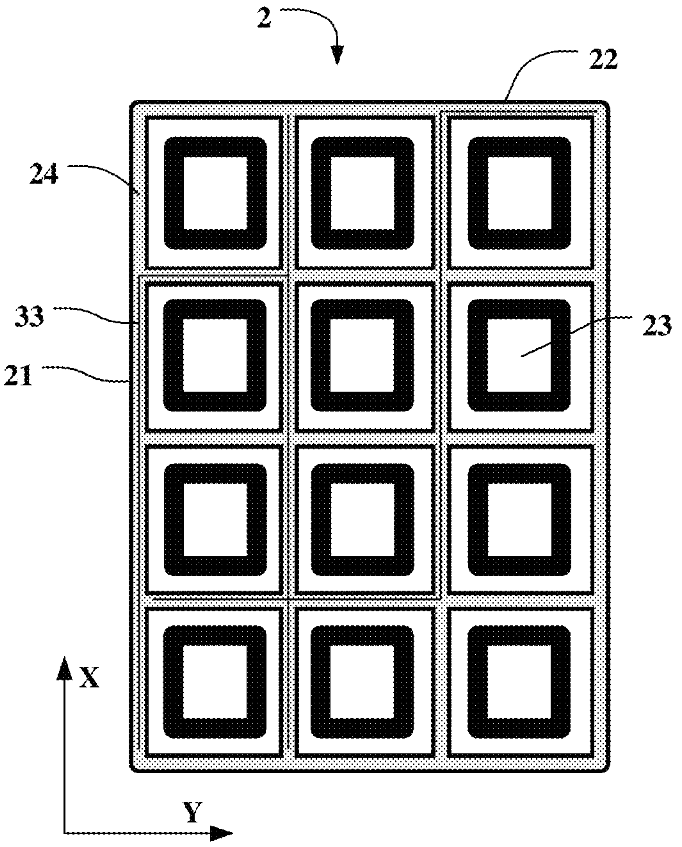
FIG. 15 is a diagram of another structure of a first frequency selective surface according to an embodiment of this application.
Figure 16:
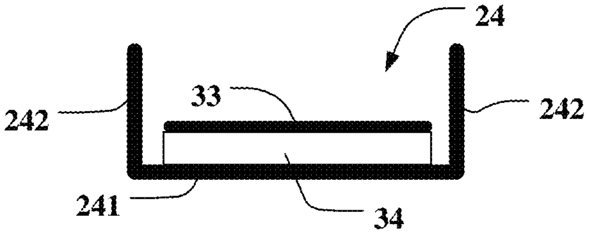
FIG. 16 is a cross-sectional schematic view of a first strip-shaped structure according to an embodiment of this application.

FIG. 15 is a diagram of another structure of a first frequency selective surface according to an embodiment of this application. FIG. 16 is a cross-sectional schematic view of a first strip-shaped structure according to an embodiment of this application. With reference to FIG. 4, FIG. 15, and FIG. 16, in a specific embodiment, the first strip-shaped structure 21 has a groove 24. Specifically, a cross section of the groove 24 along an extension direction perpendicular to the first strip-shaped structure 21 is a U-shaped section. The first structure 31 is disposed in the groove 24. For example, the first power splitting line 33 is disposed in the groove 24, or both the first power splitting line 33 and the first sliding medium 34 are disposed in the groove 24. In this solution, the groove 24 includes a first bottom wall 241 and a first side wall 242, and the first power splitting line 33 is disposed in the groove 24. In this case, the two first side walls 242 of the groove 24 may mask off a signal from a side of the first power splitting line 33, thereby reducing spill-over of a signal transmitted by the first power splitting line 33, and further improving signal transmission efficiency.

In addition, similarly, the second strip-shaped structure 22 may also have a groove 24. Specifically, a cross section of the groove 24 in an extension direction perpendicular to the second strip-shaped structure 22 is a U-shaped section. A second structure 32 may be disposed in the groove 24. For example, the first power splitting line 33 is disposed in the groove 24, or both the first power splitting line 33 and the first sliding medium 34 are disposed in the groove 24. Similarly, the groove 24 includes a first bottom wall 241 and a first side wall 242, and the first power splitting line 33 is disposed in the groove 24. In this case, the first side wall 242 of the groove 24 may mask off a signal from a side of the first power splitting line 33, thereby reducing spill-over of a signal transmitted by the first power splitting line 33, and further improving signal transmission efficiency.

In a specific embodiment, as shown in FIG. 15, the entire extension direction of the first strip-shaped structure 21 may be grooves 24, and the entire extension direction of the second strip-shaped structure 22 may be grooves 24. Alternatively, in another specific embodiment, as shown in FIG. 5 to FIG. 7, the first strip-shaped structure 21 may further have a plurality of grooves 24 along the extension direction, and the second strip-shaped structure 22 may also have a plurality of grooves 24 along the extension direction. Specifically, an overlapping area of the first strip-shaped structure 21 and the second strip-shaped structure 22 may be of a plate structure, and an area of the first strip-shaped structure 21 between two adjacent second strip-shaped structures 22 is a groove 24. An area of the second strip-shaped structure 22 between two adjacent first strip-shaped structures 21 is a groove 24. In the embodiments shown in FIG. 5 to FIG. 7, a part of the first power splitting line 33 may be disposed on the first strip-shaped structure 21, and the other part may be disposed in the second strip-shaped structure 22. Specifically, the first power splitting line 33 may bend in the overlapping area of the first strip-shaped structure 21 and the second strip-shaped structure 22.

Figure 17:
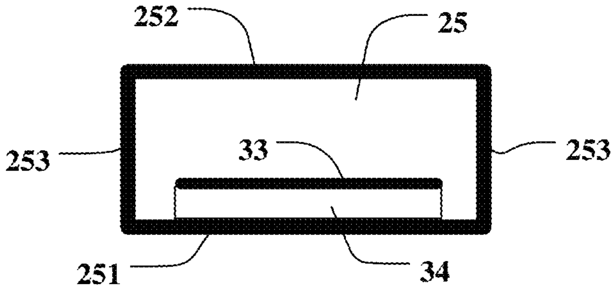
FIG. 17 is another cross-sectional schematic view of a first strip-shaped structure according to an embodiment of this application.

FIG. 17 is another cross-sectional schematic view of a first strip-shaped structure according to an embodiment of this application. As shown in FIG. 17, in another embodiment, the first strip-shaped structure 21 may further have a cavity 25. The cavity 25 includes a second bottom wall 251, a top wall 252, and two second side walls 253. The second bottom wall 251, one second side wall 253, the top wall 252, and the other second side wall 253 are sequentially connected to form the cavity 25. The first structure 31 is disposed in the cavity 25. For example, the first power splitting line 33 is disposed in the cavity 25, or both the first power splitting line 33 and the first sliding medium 34 are disposed in the cavity 25. In this case, each wall of the cavity 25 may mask off a signal, so as to further reduce spill-over of a signal transmitted by the first power splitting line 33, thereby improving signal transmission efficiency.

In addition, similarly, the second strip-shaped structure 22 may also have a cavity 25. Similarly, the cavity 25 also includes a second bottom wall 251, a top wall 252, and two second side walls 253. The second bottom wall 251, one second side wall 253, the top wall 252, and the other second side wall 253 are sequentially connected to form the cavity 25. The second structure 32 is disposed in the cavity 25. For example, the first power splitting line 33 is disposed in the cavity 25, or both the first power splitting line 33 and the first sliding medium 34 are disposed in the cavity 25. In this case, each wall of the cavity 25 may mask off a signal, so as to further reduce spill-over of a signal transmitted by the first power splitting line 33, thereby improving signal transmission efficiency.

Similarly, in a specific embodiment, the entire extension direction of the first strip-shaped structure 21 may be the cavity 25, and the entire extension direction of the second strip-shaped structure 22 may also be the cavity 25. Alternatively, in another specific embodiment, the first strip-shaped structure 21 may have a plurality of cavities 25 along the extension direction, and the second strip-shaped structure 22 may have a plurality of cavities 25 along the extension direction. Specifically, an overlapping area of the first strip-shaped structure 21 and the second strip-shaped structure 22 may be of a plate structure, an area of the first strip-shaped structure 21 between two adjacent second strip-shaped structures 22 is the cavity 25, and an area of the second strip-shaped structure 22 between two adjacent first strip-shaped structures 21 is the cavity 25.

Figure 18:
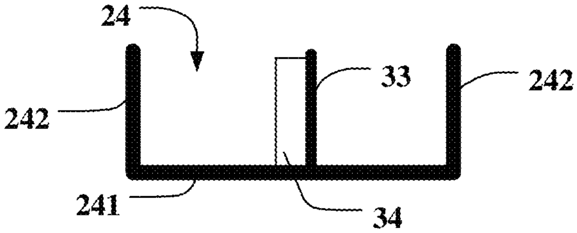
FIG. 18 is another cross-sectional schematic view of a first strip-shaped structure according to an embodiment of this application.

In a specific embodiment, when the first power splitting line 33 and the first sliding medium 34 are disposed on the first frequency selective surface 2, a manner of disposing the first power splitting line 33 and the first sliding medium 34 is not limited, provided that the first power splitting line 33 is disposed on the first frequency selective surface 2, and the signal reflection and transmission performance of the first frequency selective surface 2 are not damaged. For example, the first strip-shaped structure 21 has a groove 24, and then the first power splitting line 33 and the first sliding medium 34 are disposed in the groove 24. Specifically, the first power splitting line 33 is strip-shaped. In an embodiment, a surface of a relatively large side of the first power splitting line 33 may be disposed in parallel with the bottom wall of the groove 24, and the first sliding medium 34 may be disposed between the first power splitting line 33 and the bottom wall, as shown in FIG. 16. Alternatively, in another embodiment, a surface of a relatively large side of the first power splitting line 33 may be disposed in parallel with a side wall of the groove 24, and the first sliding medium 34 may be disposed between the first power splitting line 33 and the first side wall 242, as shown in FIG. 18.

In the embodiment shown in FIG. 15, the first structure 31 is disposed on a side that is of the first frequency selective surface 2 and that faces the first radiating element 1. For example, the first power splitting line 33 is disposed on a side that is of the first frequency selective surface 2 and that faces the first radiating element 1, so as to facilitate connection between the first radiating element 1 and the first power splitting line 33. In this case, if the first power splitting line 33 is disposed in the groove 24, that is, the first strip-shaped structure 21 has the groove 24, the groove 24 may be located on a side that is of the first frequency selective surface 2 and that faces the first radiating element 1, or an opening of the groove 24 may be located on a side that is of the first frequency selective surface 2 and that faces the first radiating element 1.

Alternatively, the second structure 32 is disposed on a side that is of the first frequency selective surface 2 and that faces the first radiating element 1. For example, the first power splitting line 33 is disposed on a side that is of the first frequency selective surface 2 and that faces the first radiating element 1, so as to facilitate connection between the first radiating element 1 and the first power splitting line 33. In this case, if the first power splitting line 33 is disposed in the groove 24, that is, the second strip-shaped structure 22 has the groove 24, the groove 24 may be located on a side that is of the first frequency selective surface 2 and that faces the first radiating element 1, or an opening of the groove 24 may be located on a side that is of the first frequency selective surface 2 and that faces the first radiating element 1.

Figure 19:
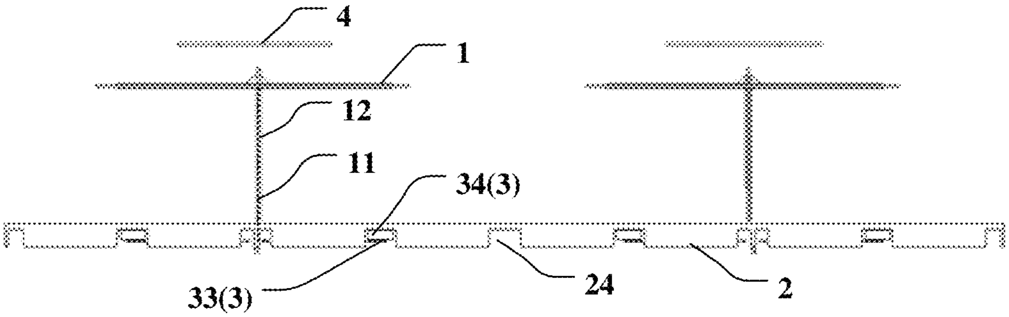
FIG. 19 is a diagram of another partial structure of a first antenna according to an embodiment of this application.

FIG. 19 is a diagram of another partial structure of a first antenna 110 according to an embodiment of this application. As shown in FIG. 19, in another embodiment, the first structure 31 may be alternatively disposed on a side that is of the first frequency selective surface 2 and that is away from the first radiating element 1. For example, the first power splitting line 33 is disposed on a side that is of the first frequency selective surface 2 and that is away from the first radiating element 1. Similarly, if the first power splitting line 33 is disposed in the groove 24, that is, the first strip-shaped structure 21 has the groove 24, the groove 24 may be located on a side that is of the first frequency selective surface 2 and that is away from the first radiating element 1, or an opening of the groove 24 may be located on a side that is of the first frequency selective surface 2 and that faces the first radiating element 1.

Alternatively, the second structure 32 is disposed on a side that is of the first frequency selective surface 2 and that is away from the first radiating element 1. For example, the first power splitting line 33 is disposed on a side that is of the first frequency selective surface 2 and that is away from the first radiating element 1. In this case, if the first power splitting line 33 is disposed in the groove 24, that is, the second strip-shaped structure 22 has the groove 24, the groove 24 may be located on a side that is of the first frequency selective surface 2 and that is away from the first radiating element 1, or an opening of the groove 24 may be located on a side that is of the first frequency selective surface 2 and that is away from the first radiating element 1.

Figure 20:
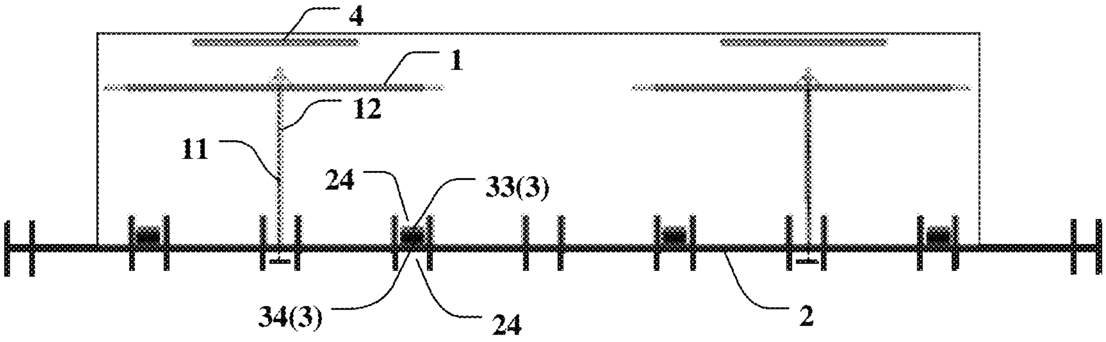
FIG. 20 is a diagram of another structure of a first antenna according to an embodiment of this application.

FIG. 20 is a diagram of another structure of a first antenna 110 according to an embodiment of this application. As shown in FIG. 20, in yet another embodiment, the first structure 31 may be alternatively disposed on a side that is of the first frequency selective surface 2 and that is away from the first radiating element 1 and a side that is of the first frequency selective surface 2 and that faces the first radiating element 1. In other words, the first feed network 3 may be disposed on either side of the first frequency selective surface 2. For example, each of two sides of the first strip-shaped structure 21 has a groove 24, so that the first power splitting line 33 and the first sliding medium 34 are disposed in the grooves 24 on the two sides. Details are not described in this application. In this solution, space for disposing the first feed network 3 may be increased. When the first feed network 3 is connected to a relatively large quantity of first radiating elements 1, or when not only the first feed network 3 is disposed on the first frequency selective surface 2, but also another feed network is disposed on the first frequency selective surface 2, this solution may be adopted, that is, all feed networks are disposed on the first frequency selective surface 2.

Alternatively, the second structure 32 may also be disposed on a side that is of the first frequency selective surface 2 and that is away from the first radiating element 1, and a side that is of the first frequency selective surface 2 and that faces the first radiating element 1. A disposition manner of the second structure 32 is the same as or similar to that of the first structure 31, and details are not repeated herein.

Figure 21:
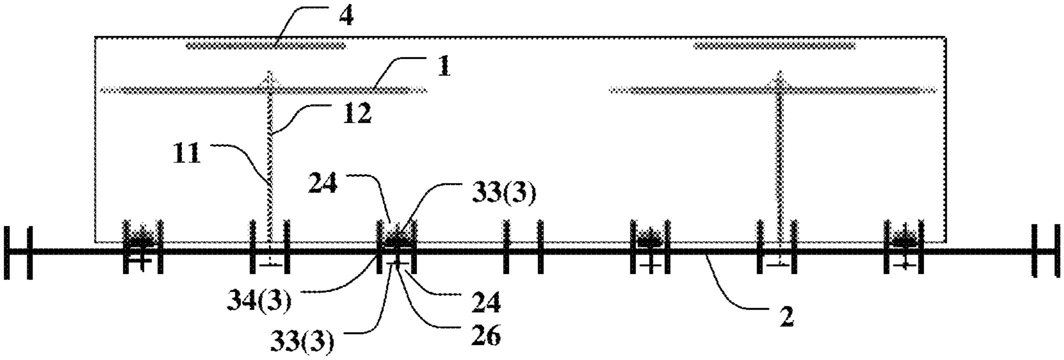
FIG. 21 is a diagram of another structure of a first antenna according to an embodiment of this application.

FIG. 21 is a diagram of another structure of a first antenna according to an embodiment of this application. As shown in FIG. 21, in yet another embodiment, when a first power splitting line 33 is disposed on each of two sides of a first frequency selective surface 2, a probe 26 may be used to connect the first power splitting lines 33 located on the two sides of the first frequency selective surface 2, so that the first power splitting lines 33 located on the two sides of the first frequency selective surface 2 form an entire feed network. In another embodiment, the first power splitting lines 33 on the two sides of the first frequency selective surface 2 may be alternatively electrically connected by using a structure such as a conductive through hole.

Figure 22:
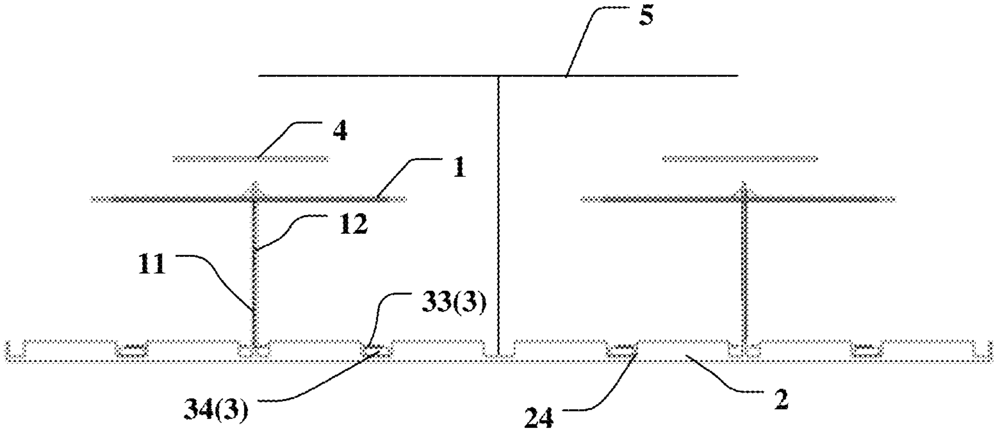
FIG. 22 is a diagram of another structure of a first antenna according to an embodiment of this application.

FIG. 22 is a diagram of another structure of a first antenna according to an embodiment of this application. As shown in FIG. 22, in another embodiment, the first antenna 110 may further include a second radiating element 5 and a second feed network 6. The second radiating element 5 and the first radiating element 1 are disposed on a same side of the first frequency selective surface 2. The second feed network 6 includes a third structure, and the third structure is also disposed on the first frequency selective surface 2. For example, the third structure includes a second power splitting line. The second radiating element 5 includes a second signal layer and a second ground layer. The second signal layer of the second radiating element 5 is electrically connected to the second power splitting line, so as to feed the second radiating element 5. The second ground layer of the second radiating element 5 is electrically connected to the first frequency selective surface 2, so that the second radiating element 5 is grounded, and the second radiating element 5 can be fixedly connected to the first frequency selective surface 2. The first frequency selective surface 2 may be further for reflecting a signal of the second radiating element 5, that is, the first frequency selective surface 2 is also equivalent to a reflection panel of the second radiating element 5. If an operating frequency band of the first radiating element 1 is different from an operating frequency band of the second radiating element 5, the first antenna 110 in this embodiment is a multi-band antenna, to implement communication of signals of different frequency bands. At least a part of a structure of the second feed network 6 is also disposed on the first frequency selective surface 2. Therefore, no additional cavity needs to be provided to bear the second feed network 6. Therefore, even if the first antenna 110 is a multi-band antenna, with the technical solution of this application, a structure of the first antenna can be simplified, a volume of the first antenna can be reduced, a volume of an antenna system can be reduced, integration of antennas on a base station can be improved, and wind load of an antenna system can be reduced.

Similarly, the third structure may be specifically disposed on a first strip-shaped structure 21, may be disposed on a second strip-shaped structure 22, or may be disposed on the first strip-shaped structure 21 or the second strip-shaped structure 22. A structure and a disposition manner of the third structure are similar to structures and disposition manners of the first structure 31 and the second structure 32 in the foregoing embodiment, and details are not repeated herein.

Figure 23:
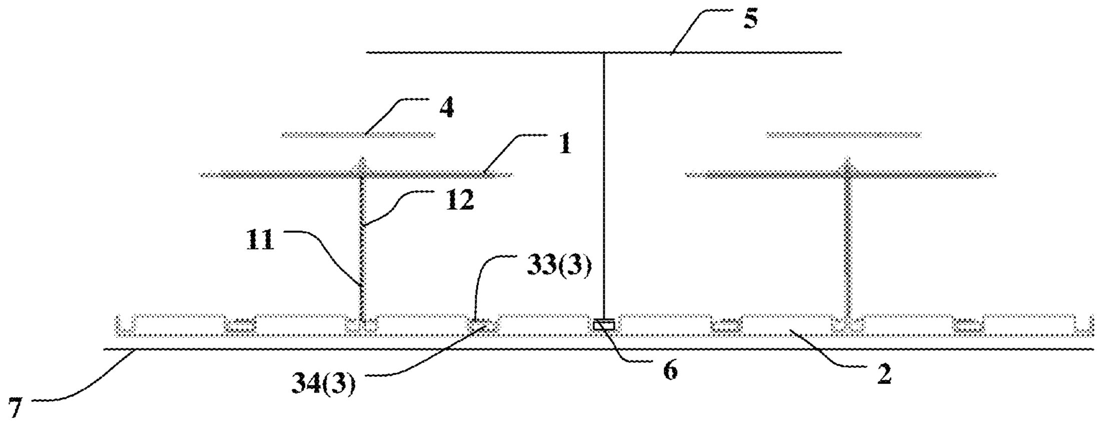
FIG. 23 is a diagram of another structure of a first antenna according to an embodiment of this application.

FIG. 23 is a diagram of another structure of a first antenna according to an embodiment of this application. As shown in FIG. 23, in another embodiment, when the first antenna 110 includes a first radiating element 1 and a second radiating element 5, and is a multi-band antenna, the first antenna 110 may further include a second frequency selective surface 7. The second frequency selective surface 7 is disposed on a side that is of the first frequency selective surface 2 and that is away from the first radiating element 1. In other words, the first antenna 110 includes two stacked frequency selective surfaces, and the second frequency selective surface 7 is also for reflecting a signal of the first radiating element 1 and a signal of the second radiating element 5. In this embodiment, the first frequency selective surface 2 cooperates with the second frequency selective surface 7 to jointly reflect signals of the first radiating element 1 and the second radiating element 5. This helps increase bandwidths for reflecting signals by the first frequency selective surface 2 and the second frequency selective surface 7, increase an operating bandwidth of the entire first antenna, and improve communication efficiency of the first antenna.

In this embodiment, because no feed network needs to be disposed on the second frequency selective surface 7, a structure may be relatively simple, provided that signals of different frequency bands can be reflected and transmitted.

Figure 24:
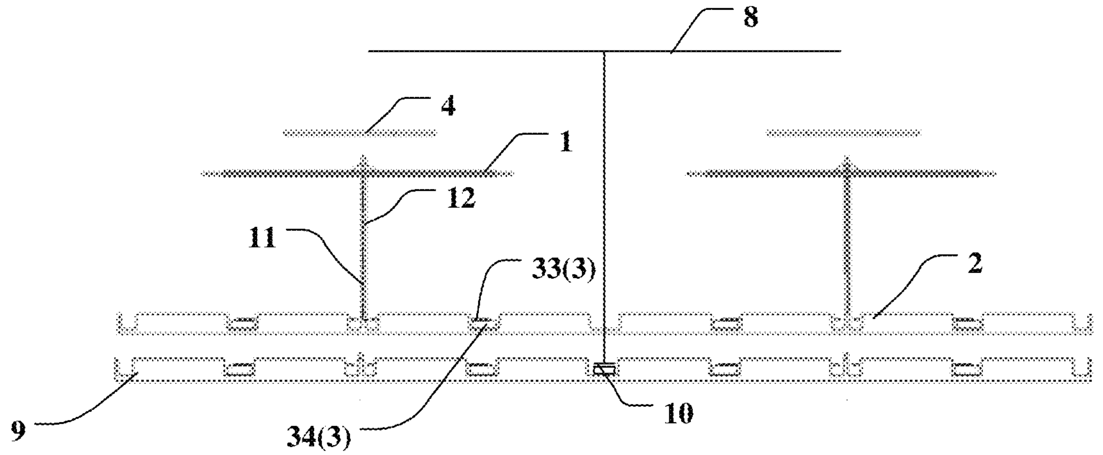
FIG. 24 is a diagram of another structure of a first antenna according to an embodiment of this application.

FIG. 24 is a diagram of another structure of a first antenna according to an embodiment of this application. As shown in FIG. 24, in another embodiment, the first antenna 110 may further include a third radiating element 8, a third frequency selective surface 9, and a third feed network 10. The third radiating element 8 and a first radiating element 1 are disposed on a same side of a first frequency selective surface 2, and the third frequency selective surface 9 is disposed on a side that is of the first frequency selective surface 2 and that is away from the first radiating element 1. If an operating frequency band of the first radiating element 1 is different from an operating frequency band of the third radiating element 8, the first antenna 110 in this embodiment is also a multi-band antenna, and may transmit signals of different frequency bands. The third feed network 10 includes a fourth structure, and the fourth structure is disposed on the third frequency selective surface 9. For example, the fourth structure includes a third power splitting line, and the third power splitting line is disposed on the third frequency selective surface 9. The third radiating element 8 includes a third signal layer and a third ground layer. The third signal layer of the third radiating element 8 is electrically connected to the third power splitting line, so as to feed the third radiating element 8. The third ground layer of the third radiating element 8 is electrically connected to the third frequency selective surface 9, so that the third radiating element 8 is grounded, and the third radiating element 8 can be fixedly connected to the third frequency selective surface 9. The third frequency selective surface 9 is for reflecting a signal of the first radiating element 1 and a signal of the third radiating element 8, and the first frequency selective surface 2 is for reflecting a signal of the first radiating element 1 and a signal of the third radiating element 8. The first frequency selective surface 2 cooperates with the third frequency selective surface 9 to jointly reflect signals of the first radiating element 1 and the third radiating element 8. This helps increase bandwidths for reflecting signals by the first frequency selective surface 2 and the third frequency selective surface 9, increase an operating bandwidth of the entire first antenna 110, and improve communication efficiency of the first antenna 110.

A structure and a disposition manner of the fourth structure may be similar to structures and disposition manners of the first structure 31 and the second structure 32 in the foregoing embodiment, and details are not repeated herein.

In this embodiment, a first feed network 3 is disposed on the first frequency selective surface 2, and the third feed network 10 is disposed on the third frequency selective surface 9. In this case, relatively large space (or area) may be left for disposing the feed network, and crosstalk between different power splitting lines can be further reduced, thereby improving signal transmission efficiency.

When the embodiment shown in FIG. 24 is specifically implemented, the first frequency selective surface 2 is provided with a through hole, and then the third signal layer and the third ground layer of the third radiating element 8 are disposed through the through hole, so that the third signal layer may be electrically connected to the third power splitting line located on the third frequency selective surface 9, and the third ground layer is electrically connected to the third frequency selective surface 9.

It should be noted that specific structures of the second frequency selective surface 7 and the third frequency selective surface 9 in the foregoing embodiment may be the same as or similar to a specific structure of the first frequency selective surface 2, or certainly may be different from a specific structure of the first frequency selective surface 2. This is not limited in this application. It is only required that the first frequency selective surface 2, the second frequency selective surface 7, and the third frequency selective surface 9 can all transmit a radiating signal of a second antenna 120.

Figure 25:
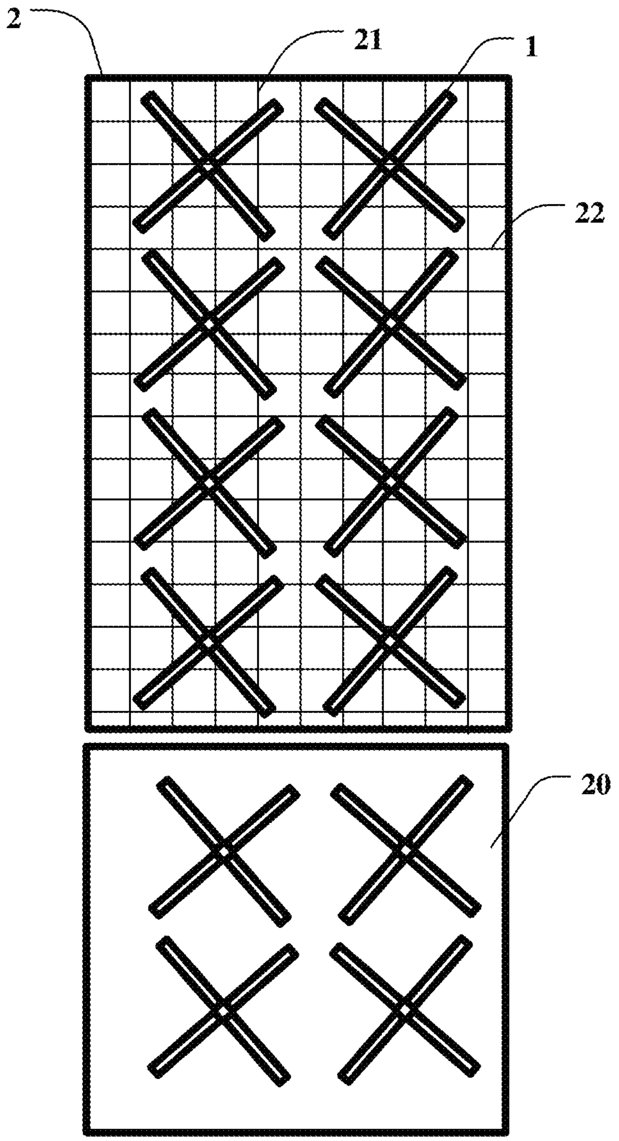
FIG. 25 is another schematic top view of a structure of a first antenna according to an embodiment of this application.

FIG. 25 is another schematic top view of a structure of a first antenna according to an embodiment of this application. As shown in FIG. 25, in this embodiment of this application, the first antenna 110 may further include a reflection panel 20. The reflection panel 20 may reflect signals of all frequency bands, and may be specifically made of metal. Both a first frequency selective surface 2 and a reflection panel 20 that are included in the first antenna 110 are for reflecting a radiating signal of the first antenna 110. One part of radiating elements included in the first antenna 110 is disposed on the first frequency selective surface 2, and the other part is disposed on the reflection panel 20. In addition to a first radiating element, the radiating element may further include a second radiating element 5 or a third radiating element 8. In this embodiment, a part of first power splitting lines 33 may be further disposed on the reflection panel 20. This is not limited in this application. With this solution, an area of the first frequency selective surface 2 of the first antenna 110 can be reduced, and costs of the first antenna 110 can be reduced. In this case, a second antenna 120 is disposed opposite to the first frequency selective surface 2, and a metal reflection panel does not block the second antenna 120, so as to ensure that a radiating signal of the second antenna 120 can pass through the first antenna 110 for radiation. Specifically, the reflection panel 20 and the first frequency selective surface 2 may be located on a same plane, or may be located on different surfaces. This is not limited in this application.

Similarly, when the first antenna 110 includes the second frequency selective surface 7, a reflection panel may also be disposed on a plane on which the second frequency selective surface 7 is located. In a specific application, the reflection panel that is located on the same plane as the second frequency selective surface 7 may be disposed corresponding to the reflection panel that is located on the same plane as the first frequency selective surface 2.

In addition, when the first antenna 110 includes a third frequency selective surface 9, a reflection panel may also be disposed on a plane on which the third frequency selective surface 9 is located. In a specific application, the reflection panel that is located on the same plane as the third frequency selective surface 9 may be disposed corresponding to the reflection panel that is in the same plane as the first frequency selective surface 2.

The first radiating element 1, the second radiating element 5, and the third radiating element 8 in any one of the foregoing embodiments may be active, or may be passive. This is not limited in this application.

Terms used in embodiments of this application are only intended to describe specific embodiments, and are not intended to limit this application. As used in the specification and the appended claims of this application, a singular expression form, terms "one", "a", "an", "the", "the foregoing", "this", "such a", and "such an", is intended to further include expressions such as "one or more", unless clearly specified to the contrary in the context.

Reference to "an embodiment" or "a specific embodiment" or the like described in the specification means that one or more embodiments of this application include a specific feature, structure, or characteristic described with reference to this embodiment. The terms, "include", "have", and their variants, all mean "include but are not limited to", unless otherwise specifically emphasized in another manner.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, comprising:

a first antenna comprising a first radiating element, a first frequency selective surface, and a first feed network, wherein the first radiating element is disposed on a first side of the first frequency selective surface; and a second antenna disposed on a second side of the first frequency selective surface, the second side being opposite from the first side upon which the first radiating element is disposed, wherein the first frequency selective surface comprises a plurality of first strip-shaped structures and a plurality of second strip-shaped structures, the plurality of first strip-shaped structures and the plurality of second strip-shaped structures are made of metal, the plurality of first strip-shaped structures intersect with the plurality of second strip-shaped structures to form a plurality of grids, wherein the first feed network comprises a first structure, and the first structure is disposed on at least one of the plurality of first strip-shaped structures, and wherein one of the plurality of first strip-shaped structures defines a groove, and the first structure is disposed in the groove.

2. The antenna system according to claim 1, wherein the first feed network further comprises a second structure, and the second structure is disposed on at least one of the plurality of second strip-shaped structures.

3. The antenna system according to claim 2, wherein one of the plurality of second strip-shaped structures defines a groove, and the second structure is disposed in the groove.

4. The antenna system according to claim 2, wherein one of the plurality of second strip-shaped structures defines a cavity, and the second structure is disposed in the cavity.

5. The antenna system according to claim 2, wherein the second structure is disposed on the first side of the first frequency selective surface, or the second structure is disposed on the second side of the first frequency selective surface.

6. The antenna system according to claim 1, wherein the first frequency selective surface further comprises a plurality of metal patches, and the plurality of metal patches are disposed in the plurality of grids.

7. The antenna system according to claim 6, wherein each one of the plurality of metal patches is disposed in a corresponding one of the plurality of grids.

8. The antenna system according to claim 1, wherein the groove defined by the one of the plurality of first strip-shaped structures further comprises a top wall to define a cavity, and the first structure is disposed in the cavity.

9. The antenna system according to claim 1, wherein the first structure is disposed on the first side of the first frequency selective surface, or the first structure is disposed on the second side of the first frequency selective surface.

10. The antenna system according to claim 1, wherein the first structure comprises a first power splitting line, and the first power splitting line is disposed on one of the plurality of first strip-shaped structures.

11. The antenna system according to claim 10, wherein the first structure further comprises a first sliding medium, and the first sliding medium is slidably disposed between the first power splitting line and the one of the plurality of first strip-shaped structures.

12. The antenna system according to claim 1, wherein the first antenna further comprises a second radiating element and a second feed network, the second radiating element and the first radiating element are disposed on a same side of the first frequency selective surface, the second feed network comprises a third structure, the third structure is disposed on the first frequency selective surface, and an operating frequency band of the first radiating element is different from an operating frequency band of the second radiating element.

13. The antenna system according to claim 12, wherein the first antenna further comprises a second frequency selective surface, and the second frequency selective surface is disposed on the second side of the first frequency selective surface.

14. The antenna system according to claim 1, wherein the first antenna further comprises a third radiating element, a third frequency selective surface, and a third feed network, the third radiating element and the first radiating element are disposed on a same side of the first frequency selective surface, and the third frequency selective surface is disposed on the second side of the first frequency selective surface; and the third feed network comprises a fourth structure, the fourth structure is disposed on the third frequency selective surface, and an operating frequency band of the first radiating element is different from an operating frequency band of the third radiating element.

15. The antenna system according to claim 1, wherein the first antenna further comprises a reflection panel for reflecting a radiating signal of the first radiating element.

16. The antenna system according to claim 1, wherein the first antenna is a passive antenna, and the second antenna is an active antenna.

17. The antenna system according to claim 1, wherein the first antenna comprises a first radome, the second antenna comprises a second radome, and the first radome and the second radome define inner cavities independent of each other.

18. The antenna system according to claim 1, further comprising a third radome, wherein the first antenna and the second antenna are disposed in an inner cavity defined by the third radome.

19. A base station, comprising a mounting frame and an antenna system, wherein the antenna system is mounted on the mounting frame;

wherein the antenna system comprises:

a first antenna comprising a first radiating element, a first frequency selective surface, and a first feed network, the first radiating element is disposed on a first side of the first frequency selective surface; and a second antenna disposed on a second side of the first frequency selective surface, the second side being opposite from the first side upon which the first radiating element is disposed; and wherein the first frequency selective surface comprises a plurality of first strip-shaped structures and a plurality of second strip-shaped structures, the plurality of first strip-shaped structures and the plurality of second strip-shaped structures are made of metal, the plurality of first strip-shaped structures intersect with the plurality of second strip-shaped structures to form a plurality of grids, wherein the first feed network comprises a first structure, and the first structure is disposed on one of the plurality of first strip-shaped structures, and wherein one of the plurality of first strip-shaped structures defines a groove or a cavity, and the first structure is disposed in the groove or the cavity.

* * * * *